March 5, 1968  J. R. ANDERSON  3,371,653
ANIMAL HEADGATE
Filed Aug. 29, 1966
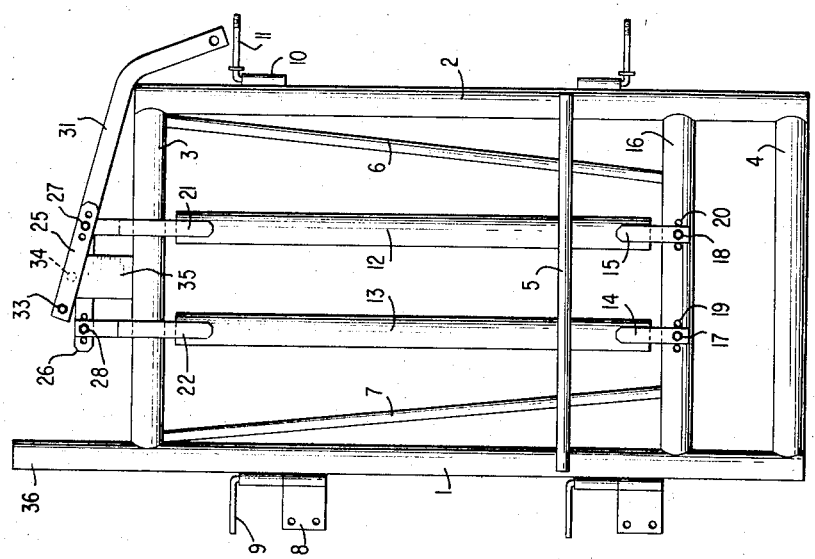
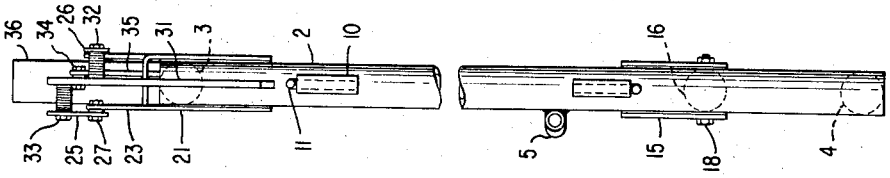
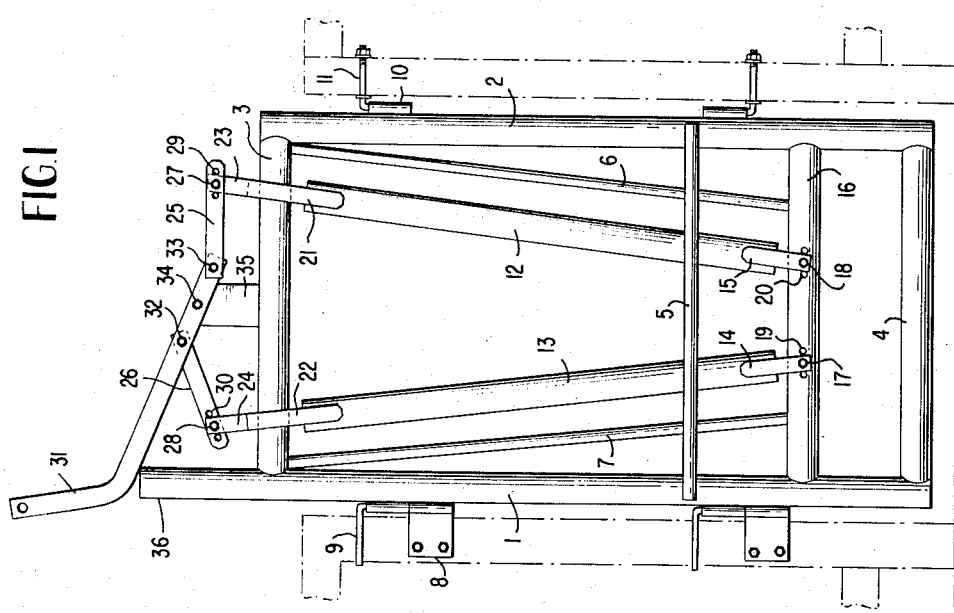
INVENTOR
J.R. ANDERSON
BY
ATTORNEY

United States Patent Office 3,371,653
Patented Mar. 5, 1968

3,371,653
ANIMAL HEADGATE
John R. Anderson, Rte. 1, Bogata, Tex. 75417
Filed Aug. 29, 1966, Ser. No. 575,712
9 Claims. (Cl. 119—98)

ABSTRACT OF THE DISCLOSURE

The present disclosure relates to an animal headgate which can be used as a stationary gate or as a portable gate which can be readily transported from one location to another. More particularly, the present disclosure is directed to an animal headgate which is provided with an opening-closing mechanism which cooperates with the gate frame to limit the opening movement of stanchion bars in one position and the closing movement of stanchion bars in a second position.

---

This invention relates to an animal headgate which can be used as a stationary gate, or as a portable gate which can be readily transported from one location to another. More particularly, the present invention concerns an animal headgate provided with an improved mechanism for operating said headgate.

The use of headgates for holding animals by the neck while they are being administered to, for example, while they are being wormed, branded, cut, and otherwise treated, is well known. However, these prior art headgates suffer from many deficiencies which limit and restrict their use for their intended purpose. For example, the presently known headgates have complicated opening and closing mechanisms which make them difficult to operate, especially under field conditions. Other headgates are heavy permanent type structures which affect their portability and substantially contribute to their expense of manufacture. Still other headgates are not adjustable to provide for both large- and small-sized animals. Thus, it can be seen that there is a need for an improved animal headgate which will satisfy the needs of the rancher and thus overcome the present deficiencies of the presently known headgates.

An object of the present invention is to produce a simple, efficient animal headgate which can be easily operated and can be readily transported from one location to another.

A further object of the present invention is to provide an animal headgate which can be either stationary or portable, and which can swing open to release the animal through the aperture closed by the gate.

Another object of the present invention is to provide an animal headgate containing an improved opening and closing mechanism which cooperates with the frame of the headgate to facilitate and simplify its operation and thus avoid the possibility of injury.

Other objects and further scope of the applicability of the present invention will become apparent from the detailed description given hereinafter; it should be understood, however, that the detailed description, while indicating preferred embodiments of the invention, are given by way of illustration only, since various changes and modifications within the spirit and scope of the invention will become apparent to those skilled in the art from this detailed description.

The animal headgate of the present invention broadly comprises an apparatus containing stanchion bars which are used to hold animals, for example, cattle, by the neck while they are wormed, branded, dehorned, cut, or otherwise treated. The animal headgate can be mounted on the end of a chute such that when the animal comes into the chute and sticks its head through the opening of the headgate, the opening-closing mechanism can be pulled shut, closing the stanchion bars around the neck of the animal, thus limiting its forward and backward motion. After having administered to the animal, the headgate can be readily opened allowing the animal to withdraw its head. The gate can then be swung completely open to release the animal through the aperture closed by the gate. The headgate of the present invention can also be simply lifted off its hinges and moved to another chute located in still another pasture. Thus, in using the headgate of the present invention, it is not necessary to buy a headgate for every chute.

In one of the preferred features of the headgate of the present invention, the side member of the supporting frame is extended at its top so that it will catch the lever attached to the opening-closing mechanism and prevent it from completely locking in the open position, thus allowing it to be operated by simply pulling on a rope attached to its handle. Thus, when the gate is opened and closed it can be done so with a minimum of effort and without the necessity of the operator pulling the stanchion bars together by the hand, thus avoiding the risk of injury.

The present invention will be more fully understood from the detailed description hereinbelow and the accompanying drawings wherein:

FIGURE 1 shows the animal headgate of the present invention in the opened position;

FIGURE 2 shows the animal headgate of the present invention in the closed position; and FIGURE 3 shows a profile or side view of the animal headgate of the present invention.

More specifically, the animal headgate of the present invention comprises a supporting frame consisting of side members 1 and 2 in substantial parallel relationship with each other and spaced apart at their top and bottom by upper member 3 and base member 4. The supporting frame also contains additional support members 5, 6 and 7 which are attached at their ends to the side members, and upper and base members respectively. Side member 1 is provided with hinges 8 affixed to said side member by bolts 9 which permit the gate to swing completely open to release the animal through the aperture closed by the gate. The headgate can also be made portable by using hinges 10 attached to the upper and lower portion of the side member and by reversing bolts 11 going into said hinges so that they will both be pointing upward. In such an arrangement, the headgate can then be simply lifted off its hinges and moved to another chute in another location and thus avoid the need for buying more than one headgate. Bolts 11 positioned on the upper and lower portion of side member 2 can be reversed and also used on side member 1. Additionally, hinges 8 and bolts 9 positioned on the upper and lower portion of side member 1 can be reversed and also mounted on side member 2, similarly as on 1.

Two stanchion bars 12 and 13 are mounted in substantially an upright position in the supporting frame. The lower end portion of each of the stanchion bars are attached to extension members 14 and 15 and their respective substantially parallel and identical side members (not shown) disposed on the opposite side of the stanchion bars. The extension members are in turn pivotally connected at their other ends to both sides of horizontal bar 16 by pivot pins 17 and 18. Horizontal bar 16 is also provided with additional holes 19 and 20 which permit the stanchion bars to be moved further apart or closer together by merely adjusting the pivot pin location. Thus, the headgate can be adjusted to accommodate both large and small animals.

The upper end portions of each of the stanchion bars are attached to extension members 21 and 22 and their substantially parallel side members (not shown) disposed on the opposite side of the stanchion bars. The extension members are slidably mounted and tunneled around upper member 3 to provide for movement of the stanchion bars toward and away from each other, longitudinally of the upper member 3. The upper portion of each of the extension members join with their respective, substantially parallel side members above upper member 3, as in FIGURE 3, to form single members 23 and 24 which connect with the closing mechanism.

The closing mechanism comprises supporting arms 25 and 26 which are pivotally connected at one end to members 23 and 24 respectively by pivot pins 27 and 28. The supporting arms are also provided with additional holes 29 and 30 at the same end which permit the stanchion bars to be moved further apart or closer together by merely adjusting the pivot pin location. Thus, the headgate can be adjusted at both its upper and lower ends. The supporting arms are further pivotally connected at their other ends to lever arm 31 by means of pivot pins 32 and 33. The lever arm is in turn pivotally connected by means of center pivot pins 34 to a vertical member 35 which is attached to upper member 3 and extends for a distance above said member.

The supporting arms and the lever arm are so mounted and cooperate in such a manner that when the headgate is in the open position, as in FIGURE 1, pivot pins 32 and 33 are on opposite sides of center pivot pin 34. In the closed position, as shown in FIGURE 2, pivot pins 32 and 33 are again on the opposite side of center pivot pin 34.

As stated above, one of the features of the present invention comprises vertically extending the side member 1 of the supporting frame for a distance above the upper member 3, forming member 36. The extended distance will vary depending upon the size of the gate. However, when normal size gates are used, member 36 extends about eight inches, above upper member 3, and functions to catch the lever arm when the opening-closing mechanism is in the open position. This prevents it from locking in the open position and thus allows the opening-closing mechanism to be operated simply by a rope attached to the handle. Thus, the headgate can be safely opened and closed without the risk of injury to the operator. The lever arm is of such a length as to engage the extension on one elongated side member and limit the opening movement of the stanchion bars in one position while being pivotal to a second position engaging the other elongated side member to limit the closing movement of the stanchion bars. Although FIGURE 1 shows a right handed headgate with the extension on the left side, in the situation where a left-handed headgate is desired, the closing mechanism can be completely reversed and side member 2 can accordingly be extended on the right side of the supporting frame.

When it is desired to move the stanchion bars 12 and 13 to the closed position as shown in FIGURE 2, wherein the upper end portions thereof are disposed substantially closer together than in the open position, as shown in FIGURE 1, the lever 31 may be pulled or rotated in a clockwise direction around the center pivot pin 34 from the position shown in FIGURE 1 to the position shown in FIGURE 2. This movement causes supporting arms 25 and 26 to pivot around pivot pins 28, 29, 32 and 33 located in their respective ends, which is effective in swinging the stanchion bars from the open position to the closed position.

When the stanchion bars are in the closed position, they are sufficiently close together to prevent an animal, for example a cow, from inserting or withdrawing its head therebetween. However, the bars are not so close as to squeeze the animal's neck after it has been secured within the headgate. In any event, the headgate of the present invention is provided with additional holes in the horizontal bar 16 and supporting arms 25 and 26 which permit the opening in the headgate to be adjusted accordingly.

When it is desired to move the stanchion bars 12 and 13 to the open position, as shown in FIGURE 1, wherein the upper end portions thereof are disposed substantially further apart than in the closed position, as shown in FIGURE 2, the lever 31 may be pulled or rotated in a counter-clockwise direction around the center pivot pin 34 which reverses the operation used to close the stanchion bars. In the open position, the lever arm 31 comes to rest on the upper extension of side member 1.

The animal headgate of the present invention is generally provided as an assembled single unit, however, it is apparent that the present headgate could also be provided in a disassembled form, and if so, could be readily assembled. The headgate can be made of any suitable material, such as for example, iron, steel or aluminum tubing, pipe and rods, and if desired certain plastics. When steel tubing is used, the stationary parts of the headgate can be attached to each other by any suitable means, such as welding. Advantageously the headgate is made of tubular steel.

The headgate of the present invention can be mounted in any suitable location such as, a doorway of a barn, or at the end of a cattle chute and can be readily transported to a pasture where the animals are located and mounted on the end of a fence. After the animal has been dehorned, branded, or otherwise administered to, the stanchion bars can be opened to permit the animal to withdraw its head, and the headgate can then be swung open away from the animal to release it through the aperture closed by the gate.

From the foregoing, it will be seen that an improved animal headgate has been developed which is readily transportable, can be adjusted for large and small animals, is of very simple construction, may be readily and economically produced commercially, and is provided with a very simple closing mechanism which cooperates with the extension of the frame to provide a headgate which can be opened and closed with a minimum risk of injury to the operator.

The invention being thus described, it will be obvious that the same may be varied in many ways. Such variations are not to be regarded as a departure from the spirit and scope of the present invention and all such modifications are intended to be included within the scope of the following claims.

I claim:

1. An animal headgate adapted to be either stationary or transportable which comprises a supporting frame composed of two elongated side members disposed in substantially parallel relationship with each other and spaced apart at their top and bottom by a substantially horizontal upper member and a substantially horizontal base member, one of said elongated side members having an extension that projects above the other side member and above said horizontal upper member, a fulcrum member secured to said horizontal upper member and projecting therefrom for a distance less than said extension, means pivotally mounting a pair of stanchion bars in substantially an upright position in said supporting frame, the upper ends of said stanchion bars having extension members connected with arm members, a lever arm pivotally connected with the fulcrum member, and the arm members being pivotally connected with the lever arm and the upper extension members of the stanchion bars, said lever arm being of such a length as to engage the said extension on said one elongate side member and limit the opening movement of the stanchion bars in one position and being pivotal to a second position engaging the other elongated side member to limit the closing movement of the stanchion bars.

2. The animal headgate of claim 1 wherein the lever arm is pivotally connected at its one end by a center pivot pin to a substantially vertical fulcrum member secured to the upper member and projecting for a vertical distance upwardly therefrom for a distance less than the extension of the elongated side member, wherein when the stanchion bars are in the open or closed position, the pivotal connections between the arm members and the lever arm are on opposite sides of the center pivot pin.

3. The headgate of claim 1 wherein the supporting frame is provided with hinges at the upper portion and the lower portion of each elongated side member to adapt said headgate to being either stationary or transportable.

4. The headgate of claim 1 wherein the stanchion bars have extension members at their lower ends which are pivotally connected to a substantially horizontal bar spaced above said base member.

5. The headgate of claim 4 wherein said horizontal bar is provided with holes which permit the lower end portions of the stanchion bars to be moved further apart or closer together.

6. The headgate of claim 1 wherein the portion of the arm members which connect with the upper extension of the stanchion bars is provided with holes which permit the upper end portions of the stanchion bars to be moved further apart or closer together.

7. An animal headgate adapted to be either stationary or transportable which comprises a supporting frame composed of two elongated side members disposed in substantially parallel relationship with each other and spaced apart at their top and bottom by a substantially horizontal upper member and a substantially horizontal base member, one of said elongated side members having an extension which projects above the other side member and above said horizontal upper member, a fulcrum member secured to said horizontal upper member and projecting for a vertical distance upwardly therefrom for a distance less than the extension of the elongated side member, means pivotally mounting a pair of stanchion bars in substantially an upright position in said supporting frame, a lower extension member attached to the lower end portions of each of the stanchion bars, said lower extension members being pivotally connected to a substantially horizontal bar spaced above the base member, the upper end portions of said stanchion bars having extension members connected with arm members, said extension members slidably mounted and tunneled around said horizontal upper member for movement of the stanchion bars towards and away from each other, longitudinally of the upper horizontal member, a lever arm pivotally connected with the fulcrum member, and the arm members being pivotally connected with the lever arm and the upper extension members of the stanchion bars, said lever arm being of such a length as to engage the said extension on said one elongated side member and limit the opening movement of the stanchion bars in one position and being pivotal to a second position engaging the other elongated side member to limit the closing movement of the stanchion bars.

8. The headgate of claim 7 wherein the supporting frame is provided with hinges at the upper portion and the lower portion of each elongated side member to adapt said headgate to being either stationary or transportable.

9. The headgate of claim 7 wherein the construction is primarily tubular steel.

References Cited

UNITED STATES PATENTS

| | | | |
|---|---|---|---|
| 1,166,450 | 1/1916 | Dolan | 119—99 |
| 2,536,236 | 1/1951 | Thomas | 119—27 |
| 2,997,982 | 8/1961 | Trogdon | 119—98 |
| 3,194,212 | 7/1965 | Saver | 119—98 |
| 3,229,666 | 1/1966 | Sedevie | 119—98 |

FOREIGN PATENTS 738,971  10/1955  Great Britain.

HUGH R. CHAMBLEE, *Primary Examiner.*